April 13, 1965    A. L. RIGERS    3,178,156
MOBILE TIRE CHANGER RAMP
Filed Jan. 16, 1963    4 Sheets-Sheet 1

INVENTOR.
ADOLPH L. RIGERS
BY
Kimmel & Crowell
ATTORNEYS.

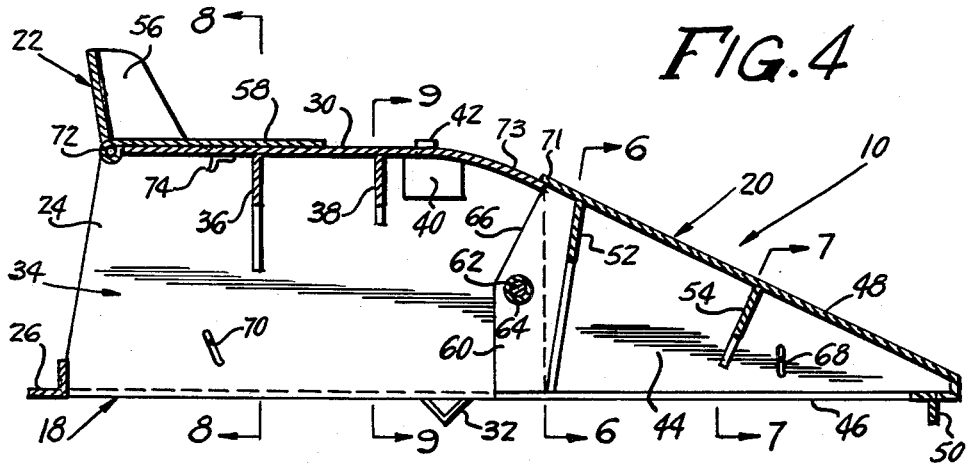
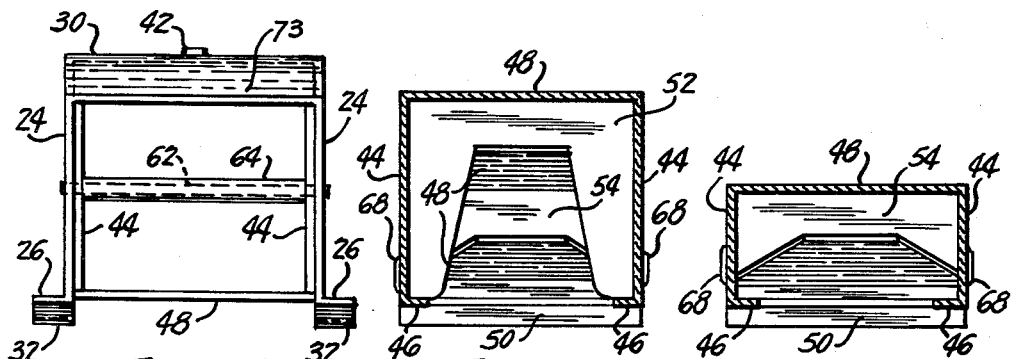
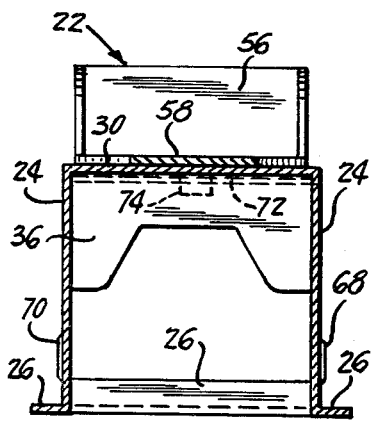
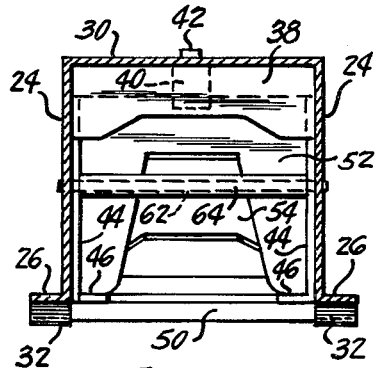
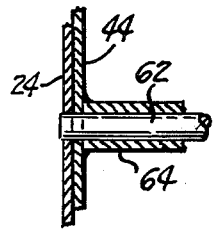

INVENTOR.
ADOLPH L. RIGERS
BY
Kimmel & Crowell
ATTORNEYS.

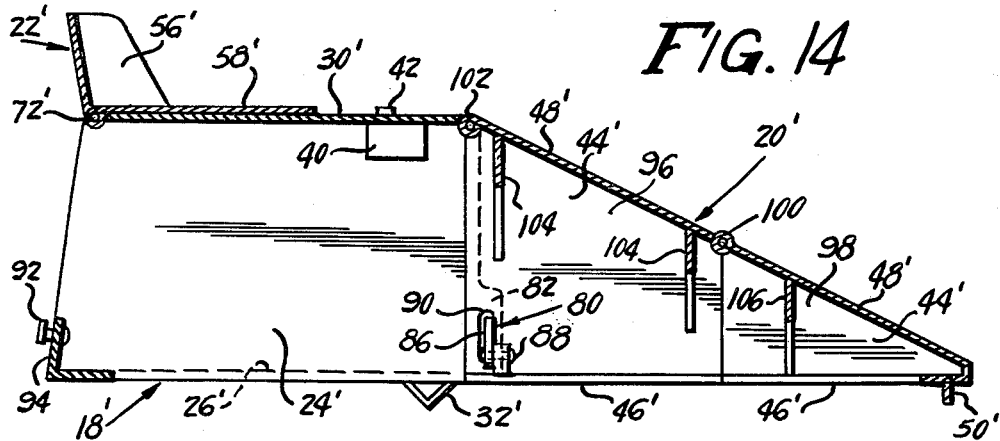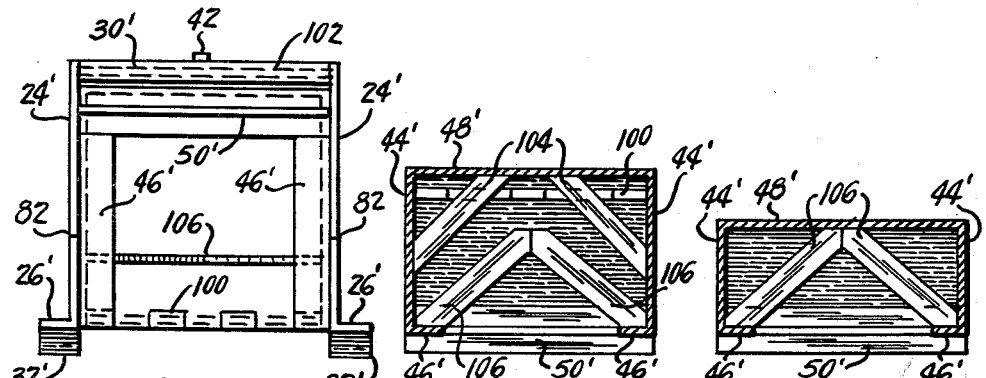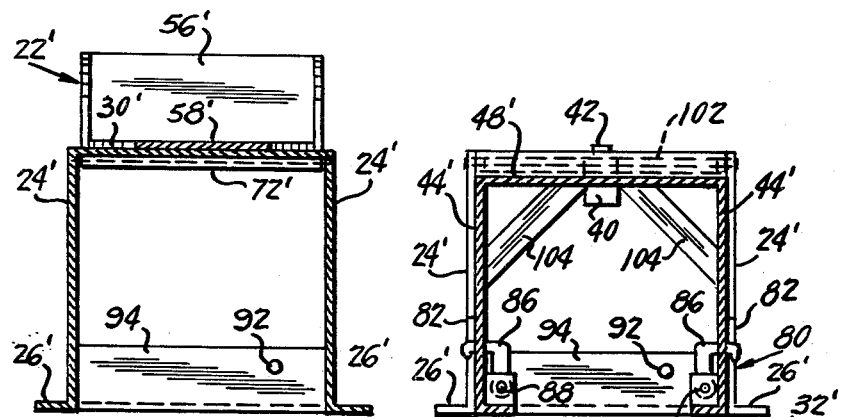

United States Patent Office 3,178,156
Patented Apr. 13, 1965

3,178,156
MOBILE TIRE CHANGER RAMP
Adolph L. Rigers, Rte. 1, Box 293, McMinnville, Oreg.
Filed Jan. 16, 1963, Ser. No. 251,965
10 Claims. (Cl. 254—88)

This invention relates to a mobile tire changer ramp and relates more particularly to a device for assisting in changing tires on a vehicle having tandemly mounted wheels.

A primary object of this invention is the provision of a mobile tire changer ramp which is inexpensive to manufacture, sturdy in construction and efficient in use.

Another object of this invention is to provide a device of the type described which is readily folded from an operating position to a storage position.

A further object of the instant invention is to provide a device for assisting in changing tires on vehicles such as trailers or the like having tandemly mounted wheels, which device has a supporting element to support one of said wheels in spaced relation to a supporting surface such as the ground or the like, and a forward ramp element to allow the wheel to be driven onto the supporting element.

A still further object of this invention is to provide a device of the type described having further, in combination, a rearward stop element to prevent the wheel from riding off of the supporting element.

Another object of this invention is to provide a mobile tire changer ramp of the type set forth wherein the ramp element and stop element are foldable within the supporting element for ease of handling.

A further object of this invention is to provide a device to assist in changing tires on vehicles having tandemly mounted wheels wherein a signal element may be associated therewith to indicate to the vehicle operator that he is in position on the device and should apply his brakes.

Other and further objects reside in the combination of elements, arrangements of parts and features of construction.

Still other objects will in part be obvious and in part be pointed out as the description of the invention proceeds and as shown in the accompanying drawings wherein:

FIGURE 4 is a vertical cross-sectional view taken on line 4—4 of FIGURE 3.

FIGURE 5 is a front or forward end view of the embodiment of FIGURE 2 folded into the storage position.

FIGURE 6 is a transverse cross-sectional view through the ramp element taken on line 6—6 of FIGURE 4.

FIGURE 7 is a transverse cross-sectional view taken on line 7—7 of FIGURE 4.

FIGURE 8 is a transverse cross-sectional view through the supporting element taken on line 8—8 of FIGURE 4.

FIGURE 9 is a transverse cross-sectional view taken on line 9—9 of FIGURE 4.

FIGURE 10 is a fragmentary enlarged detail of the pivot structure of the embodiment of FIGURES 1–9.

FIGURE 14 is a vertical cross-sectional view taken on line 14—14 of FIGURE 13.

FIGURE 15 is a front or forward end elevational view of the embodiment illustrated in FIG. 11, in storage position.

FIGURE 16 is a transverse cross-sectional view through the upper ramp portion of the ramp element taken on line 16—16 of FIGURE 12.

FIGURE 17 is a transverse cross-sectional view through the lower ramp portion of the ramp element taken on line 17—17 of FIGURE 12.

FIGURE 18 is a transverse cross-sectional view through the supporting element taken on line 18—18 of FIGURE 12; and FIGURE 19 is a transverse cross-sectional view through the upper ramp portion of the ramp element taken on line 19—19 of FIGURE 12.

Similar reference characters refer to similar parts throughout the several views of the drawings.

Figures 1, 2, 3:
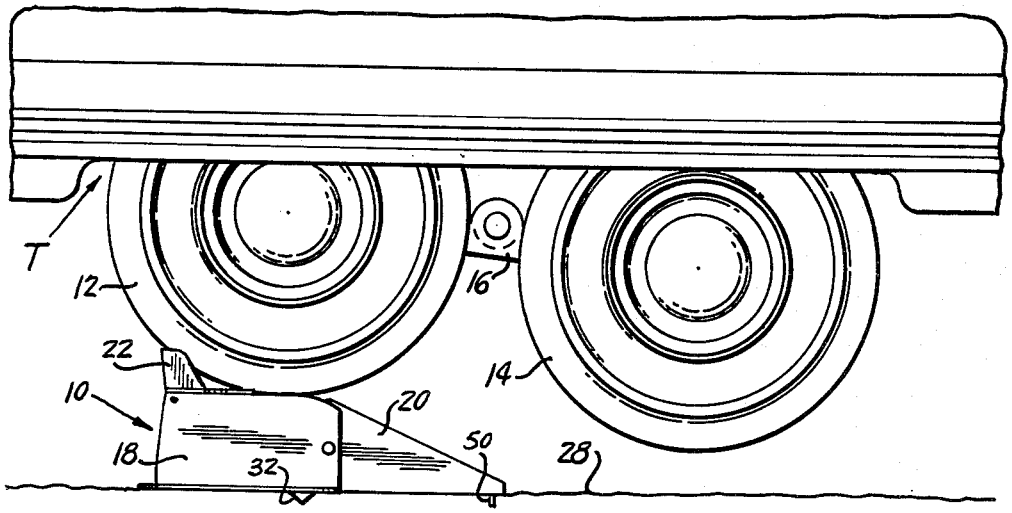
FIGURE 1 is a side elevational view of one embodiment of the device of the instant invention in operating position and having supported thereon one wheel of a pair mounted in tandem on a vehicle, with parts broken away for illustrative convenience.
FIGURE 2 is an enlarged side elevational view of the embodiment of FIGURE 1 with the device in storage position shown in dotted lines.
FIGURE 3 is a top plan view of the mobile tire changer ramp in accordance with the instant invention.
Figure 11:
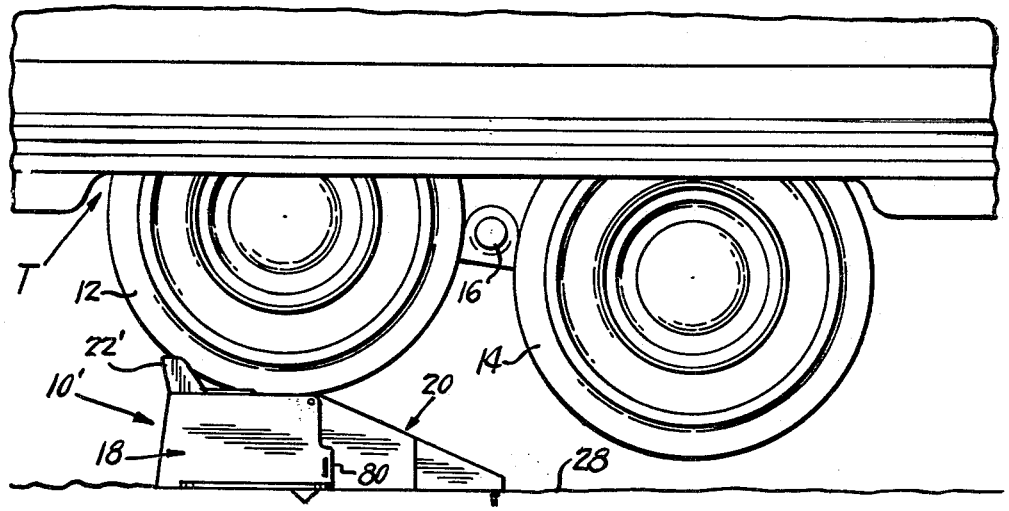
FIGURE 11 is a side elevational view similar to FIGURE 1 of another embodiment of a mobile tire changer ramp in accordance with the instant inventive concept.
Figure 12:
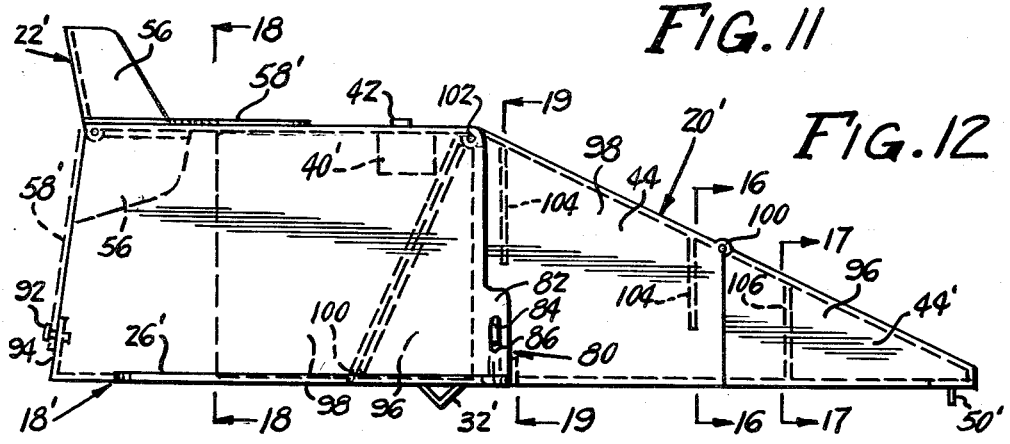
FIGURE 12 is an enlarged side elevational view of the embodiment of FIGURE 11, showing the elements in their storage position in dotted lines.
Figure 13:
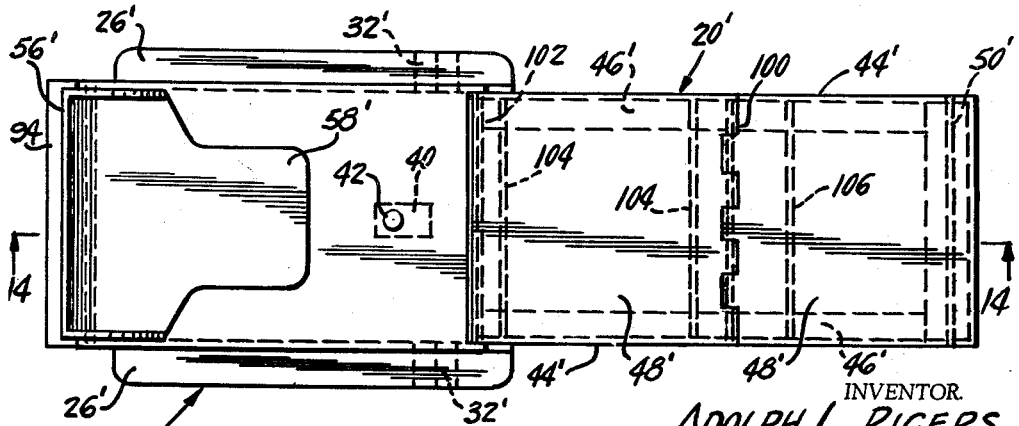
FIGURE 13 is a top plan view of the embodiment illustrated in FIG. 11.

Referring now to the drawings in general and more particularly to FIGURE 1, one embodiment of a mobile tire changer ramp in accordance with the instant inventive concept is indicated generally by the reference numeral 10. A fragment of a vehicle such as a trailer T is shown having two wheels 12 and 14 tandemly mounted at 16 in any conventional manner, the wheel 12 being supported on the mobile tire changer ramp 10 so that the tire on the wheel 14 may be readily removed and changed without the necessity of a jack or the like.

The embodiment of FIGURES 1–10 is comprised basically of a supporting element 18, a forward ramp element 20 and a rear stop element 22.

The supporting element 18 has a pair of downwardly extending transversely spaced side members 24 having outwardly extending flange means 26 at their bottom end to engage a supporting surface such as the ground or the like 28. An upper plate member 30 extends between the side members 24 and is adapted to support the wheel 12 in the manner shown in FIGURE 1. The flange means 26 may extend around the rear of the supporting element 18 (note particularly FIGURE 3), and may have a plurality of downwardly extending lugs 32 for frictional engagement with the supporting surface 28. The front, rear and bottom of the supporting element 18 are open for a purpose to be described hereinafter and the side members 24 and upper member 30 define a cavity 34 therebetween. A plurality of bracing means 36, 38 may be included within the cavity 34 to reinforce the element 18. A receptacle 40 is provided for supporting a signal element 42 of any conventional design and for a purpose to be described in further detail hereinafter.

The ramp element 20 is comprised of a pair of transversely spaced side plate members 44 having inwardly extending flange means 46 at their bottom to engage the supporting surface 28 and a ramp member 48 secured to the side members 44 and extending from the supporting surface 28 to the upper plate member 30 on the supporting element 18. A downwardly extending flange member or lug 50 traverses the front of the ramp element 20 for frictional engagement with the supporting surface 28. Brace means 52 and 54 are provided within the ramp member 20 to reinforce the same.

The rear stop element 22 is comprised of a substantially U-shaped upwardly extending member 56 integrally secured to a base member 58 for a purpose to be described in further detail hereinafter.

The side walls 44 of the ramp element 20 have portions 60 extending rearwardly and telescoping within the side walls 24 of the supporting element 18. A pivot pin 62 extends between the side walls 24 of the supporting element 18 and a sleeve member 64 circumscribes the pivot pin 62 and is secured to the side walls 44 of the ramp element 20 to pivotally support the ramp element 20 with respect to the supporting element 18. Note particularly FIGURE 10.

The portions 60 of the side walls 44 of the ramp element 20 are cut away as at 66 so that when the ramp element 20 is folded about the pivot pin 62 into the dotted storage position shown in FIGURE 2, it fits in nesting relationship in the cavity 34.

In the operating position, the upper end 71 of the ramp member 48 overlies a downwardly bent portion 73 of the top wall 30 of the supporting element 18.

Any means may be provided to retain the ramp element 20 in its storage position, such as spring pressed lugs 68 in the side walls 44 of the ramp element 20 and recesses 70 in the side walls 24 of the supporting element 18. It is to be understood that these may merely be frictionally engaged and that it is not necessary to provide spring pressure on the lug 68 or recesses in the side walls 24.

The rear stop element 22 may also be folded into the cavity 34 of the supporting element 18 for storage and to this end a hinge means 72 is provided pivotally connecting the stop element 22 with the upper member 30 of the supporting element 18. Any conventional means may be provided for securing the stop element 22 in its storage position and a spring catch 74 engageable with the U-shaped member 56 of the stop element 22 is shown attached to the inside of the upper member 30 for this purpose.

Since the front side of the supporting element 18 is open, it will be apparent that the sleeve 64 circumscribing the pivot pin 62 will be accessible when the device 10 is in its storage position to assist in handling or carrying the device. Note particularly FIGURES 5 and 9.

The use and operation of the embodiment of FIGURES 1–10 will now be readily seen. The device 10 of the instant invention is open to its operating position by releasing the means 68, 70 securing the ramp element 20 within the supporting element 18 and swinging the ramp element 20 about the pivot pin 62. The U-shaped member 56 of the stop element 22 is then released from the catch 74 and the stop element 22 is pivoted about the hinge means 72 into the operating position. The entire device 10 is then positioned on the supporting surface 28 so that the flange means 26 and 46 are supported thereon and the lugs 32 and 50 are in gripping relationship therewith. The device 10 is positioned in line with the wheel having the inflated tire such as 12 of the pair of tandem wheels 12, 14 and the hub cap and bolt nuts (not shown) are preferably loosened from the wheel 14 having the flat tire while the weight of the trailer T remains on the supporting surface 28. Then the trailer T is backed over the ramp member 48 of the ramp element 20 until it is supported by the upper member 30 of the supporting element 18. In this position it will overlie and contact the base member 58 of the stop element 22 so that the stop element 22 cannot pivot from its operating position to its storage position. The wheel 12 is also in contact with the upwardly extending U-shaped member 56 of the stop element 22 to prevent the wheel from slipping off to the rear of the upper member 30 of the supporting element 18. It is advisable that the emergency brake of the vehicle (not shown) pulling the trailer T be engaged when the wheel 12 is supported by the device 10 of the instant invention and the gear shift should be left either in park or in gear to prevent the vehicle and trailer T from moving. The flat tire can then be easily removed from the wheel 14 and replaced. The trailer T is driven off the device 10 when the operation is complete.

It is readily understood that if the tire on the rear wheel 12 is flat, the device 10 of the instant invention is placed in line with the front wheel 14 of the pair of tandemly mounted wheels 12, 14, and the wheel 14 is driven up the ramp member 48 of the ramp element 20 and is supported on the upper member 30 of the supporting element 18.

Referring now to FIGURES 11–19, a further embodiment of the mobile tire changer ramp 10 of FIGURES 1–10 is shown. This embodiment is substantially the same as the embodiment of FIGURES 1–10. Thus, only the differences will be pointed out.

Means 80 have been added to lock the ramp element 20' in its operating position with regard to the supporting element 18'. The means 80 are comprised of a pair of forwardly extending ears 82 on the side walls 24' of the supporting element 18' having slots 84 therein. A pair of hooks 86 are pivotally supported at 88 within the ramp element 20' adjacent the rear thereof and are engageable through slots 90 in the side walls 44' of the ramp element 20' and the slots 84 to lock these elements in relation to each other. Note particularly FIGS. 12, 14, and 19.

The rear stop element 22' is locked in its storage position in this embodiment by engaging the base member 58' with a locking element 92 secured to an upwardly extending portion of a flange means 94. Note particularly FIGURES 12 and 14.

The ramp element 20' in this embodiment is formed in two sections, an upper ramp portion 96 and a lower ramp portion 98 which are hingedly secured at 100 to each other, the upper ramp portion 96 being hingedly secured at 102 to the upper member 30' of the supporting element 18. When the locking means 80 have been released, the upper and lower ramp portions 96 and 98, respectively, may be folded upon their hinge means 100 and 102 into the storage position shown in dotted lines in FIGURE 12. It is obvious that any conventional means, such as the spring pressed lugs and recesses 68, 70 shown in the embodiments of FIGURES 1–10 may be included with this embodiment to retain the portions of the ramp element 20' within the supporting element 18'.

Brace means 104 and 106 have been included with this embodiment to reinforce the elements and to indicate that the design of the bracing means may be readily varied to suit the specific design of the device.

Other elements in the embodiment of FIGURES 11–19 that are substantially the same as corresponding elements in the embodiment of FIGURES 1–10 have been given corresponding reference numerals with the addition of a prime (').

It is now apparent that the device shown in the embodiments of FIGURES 11–19 will be used in the same manner as that shown in the embodiment of FIGURES 1–10 and that there is herein provided a device which satisfies all of the objectives of the instant invention, and others, including many advantages of great practical utility and commercial importance.

It is to be understood that any conventional signal element 42 may be incorporated with either embodiment of the device of the instant invention and that it will function to indicate to the operator of the vehicle (not shown) pulling the trailer T, that the trailer is in position on the device and that the brakes should be applied. This can be done readily by having an alarm bell attached to a pressure element or electrical connections may be secured from the signal element 42 to the horn or a light on the dashboard of the vehicle driven by the operator.

Since many embodiments may be made of this inventive concept and since many modifications may be made of the embodiments hereinbefore shown and described, it is to be understood that all matter herein is to be considered as merely illustrative, and not in a limiting sense.

I claim:

1. A device for assisting in changing tires on vehicle mounted wheels,
   the device comprising a longitudinally extending supporting element and a longitudinally positioned front ramp element, the latter horizontally pivoted transversely within the front end of the supporting element, the supporting element having a substantially horizontal upper plate member for supporting a vehicle wheel and two transversely spaced equal height vertical side plate members each connected at its top to an edge of the upper plate member thus defining a cavity within the supporting element, the side members possessing along their bottoms outwardly directed horizontal flange means, the ramp element having a forwardly and downwardly inclined top plate of a width less than that of the cavity and two vertical and generally triangular side plate members each connected at its top to an edge of the top plate, the latter side members possessing at their bottoms inwardly directed horizontal flange means coplanar in a device operating position with the first recited horizontal flange means, and a further inwardly directed coplanar horizontal flange extending transversely across the bottom of the ramp at its most forward position, all of the flanges aiding in securely vertically engaging the device upon a common support such as the ground, and downwardly directed lug means attached to, across, and below each outwardly directed flange and attached to, completely along, and below the further flange, all the lugs means aiding in securely longitudinally engaging the device with respect to a common support such as the ground.

2. The structure of claim 1 and in addition thereto, a stop element pivotally secured at the rear of the upper plate of the supporting element, and including a horizontal base plate supported on the upper plate and of sufficient length from its pivot to its free end to be pressed vertically downward upon the upper plate by a contacting wheel mounted tire when in operative position, a transverse upstanding plate member integral with the base plate and inclined upwardly and slightly rearwardly from a vertical plane passing through the latter pivot thus forming an obtuse angle between the base plate and the upstanding plate, the upstanding length of the transverse plate from its pivot to its free but tire contacting end being much less than the length of the base plate, and a pair of parallel vertical gussett connections between the coplanar adjacent edges of the base plate and the transverse plate, whereby in use a tire would be guided between the gussets and centrally between the sides of the device, and the transverse plate would be urged to remain upstanding to thus retard excess longitudinal travel of the supported tire with respect to the supporting element and the common support.

3. The structure of claim 2 wherein, the overall dimension between the outsides of the gusset connections is less than the transverse dimension of the cavity, whereby said stop element is movable between the above operating position and a storage position within the supporting element, and securing means are provided between the support element and one of the plates of the stop to retain the stop element when moved to the storage position.

4. The structure of claim 3 wherein the securing means is a spring latch mounted on the underside of the upper plate of the supporting element at a position to cooperate with the storage position of the upstanding plate member of the stop element.

5. The structure of claim 3 wherein, the angles between the top horizontal edges and the rear upstanding edges of each side plate of the supporting element is equal to the obtuse angle between the base plate and upstanding plate of the stop element, and the seruring means is mounted on a transverse flange at the rear of the support element, the base plate of the stop element contacting said flange when the stop element is in a storage position.

6. The structure of claim 2 wherein, a gravity pressure indicating signal device is incorporated in the upper plate of the supporting element, at a location between the top of the front ramp and the free end of the horizontal base plate of the rear stop element, the sensing portion of the signal device being exposed above said upper plate, to contact a tire when traveling thereover in either longitudinal direction.

7. The structure of claim 1 wherein, the ramp element is pivoted to the forward end of the upper plate of the supporting element, the ramp element is formed by horizontally matching of adjacent vertical faces of equal length parts of a higher ramp portion and a lower ramp portion, the top plates of the ramp portions being colinear in operating position and joined by a hinge, whereby the lower ramp portion may be folded for storage about the hinge to place the top plates of the two portions in contacting parallel relationship, and the upper and lower ramp portions may be simultaneously swung about the pivot at the end of the upper plate of the supporting element, and into the cavity of the supporting element, the length of each ramp portion being approximately equal to the free height of the cavity so that the two ramp portions may be nested completely within the device.

8. The structure of claim 7 wherein, the higher ramp portion is secured in longitudinal extending operating position by a pair of outwardly directed hooks pivotally secured to the vertical faces of the higher ramp portion, each hook individually engageable in an adjacent slot in a forwardly extending ear member near the bottom of each side plate wall of the supporting element.

9. The structure of claim 1, wherein, the horizontal pivot for the ramp is located approximately midheight with respect to the side plate members of the supporting element, the upper plate member of the supporting element is curved downwardly slightly at its front end and has a transverse reinforcement under its lowest portion, the top plate of the ramp has an edge which overlies the reinforcement and the lowest portion of the curve, the pivot for the ramp is located vertically below said curved portion of the upper plate and longitudinally spaced to the rear of the vertical front edge of the side plate members of the supporting element, the side plate members of the ramp at their pivot end being delineated by two lines, namely, a first line which contacts the transverse reinforcing element of the upper plate of the support and contacts the underside of the top plate of the ramp and extends substantially perpendicular from the latter plate, and a second line which is substantially vertical and intersects the first line at a distance away from the pivot, whereby the changing direction support path for the tire and wheel from inclined to horizontal and vice versa is smooth, the support structure at this change direction area is strongly reinforced, and the ramp when placed in a storage position is dimensionally suitable to pivot completely within the front end of the supporting element without interference between the vertically wide portion of the ramp and the upper plate of the supporting element.

10. In a device for assisting in changing tires on vehicle mounted wheels comprising, a support element having a longitudinally extending rectangular and substantially horizontal upper plate, and two equal height vertical side plates integral with parallel edges of the upper plate to thus form a hollow arch with open ends, a ramp element having a top plate of uniform width less than the clear dimension between the side plates of the support element, and including two varying height vertical side plates integral with parallel edges of the top plate, the lower plate portions at the maximum height end of each variable height side plate telescoping within the side plates of the support element to thus form a hollow arch of variable height and an open end portion of maximum height, a pivot pin passing horizontally through a midheight portion of the four side plates, and a sleeve freely circumscribing the pivot pin, the sleeve secured to the side plates of the ramp, whereby when the ramp is moved from an operative position to a storage position within the support element, by pivoting the ramp about the pin, the sleeve will be exposed at the open end of the support and the open end of the ramp, and the sleeve is accessible to function as a central carrying handle.

References Cited by the Examiner

UNITED STATES PATENTS

| | | | |
|---|---|---|---|
| 1,647,935 | 11/27 | Scholler | 254—88 |
| 1,650,182 | 11/27 | Brochu | 254—88 |
| 1,922,553 | 8/33 | McCosh | 254—88 |
| 2,296,311 | 9/42 | Schneider | 116—28 |
| 2,383,661 | 8/45 | Lopez | 254—88 |

FOREIGN PATENTS

| | | |
|---|---|---|
| 296,898 | 9/28 | Great Britain. |
| 755,620 | 8/56 | Great Britain. |

WILLIAM FELDMAN, *Primary Examiner.*